P. C. HEWITT.
METHOD OF AND APPARATUS FOR TRANSFORMING ELECTRICAL ENERGY.
APPLICATION FILED MAY 12, 1914.

1,321,432.

Patented Nov. 11, 1919
6 SHEETS—SHEET 1.

WITNESSES
Chas. F. Clagett
M. E. McNinch

INVENTOR
Peter Cooper Hewitt
BY Gifford & Bull
his ATTORNEYS

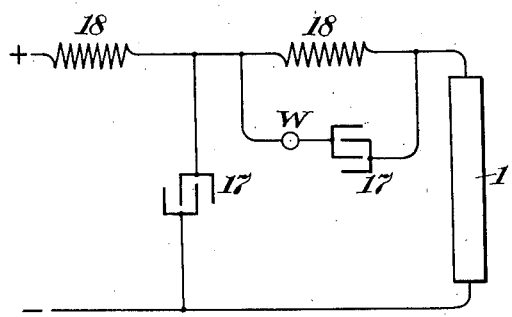
Fig.6
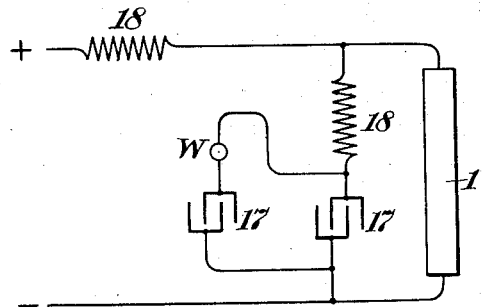
Fig.7
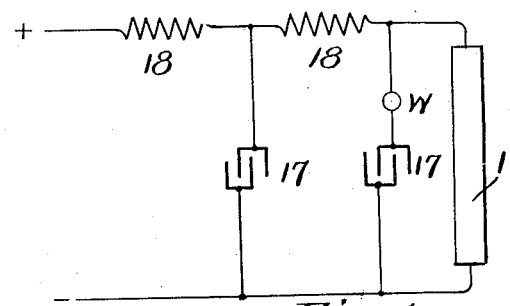
Fig.4
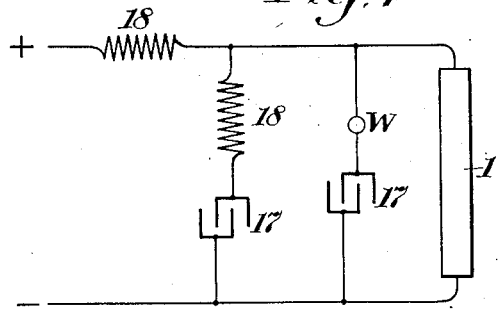
Fig.8
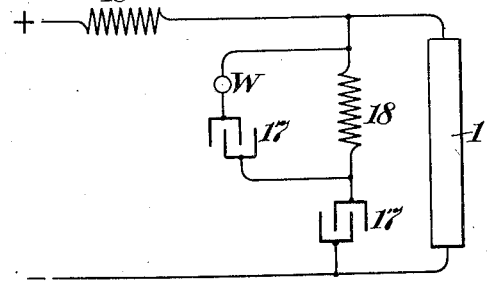
Fig.5
Fig.9

P. C. HEWITT.
METHOD OF AND APPARATUS FOR TRANSFORMING ELECTRICAL ENERGY.
APPLICATION FILED MAY 12, 1914.
1,321,432.
Patented Nov. 11, 1919.
6 SHEETS—SHEET 4.
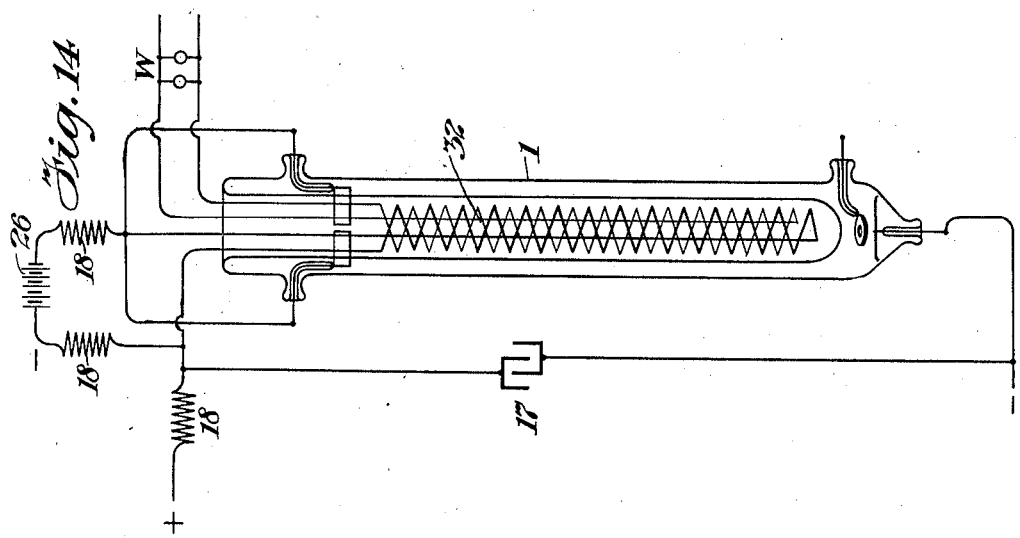
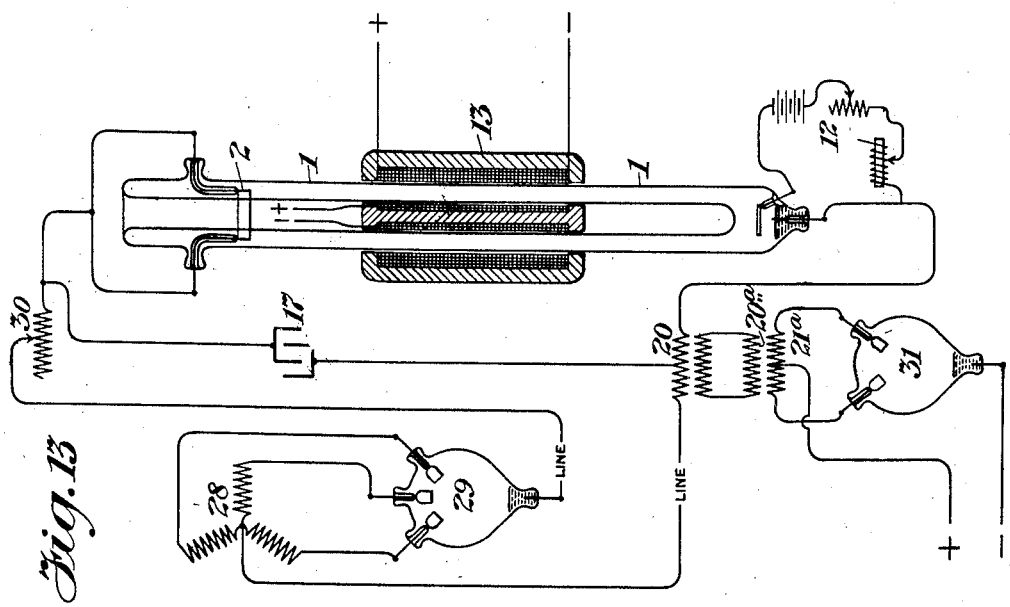
WITNESSES
Chas. F. Clagett
M. E. McNinch
INVENTOR
Peter Cooper Hewitt
BY Gifford Bull
his ATTORNEYS

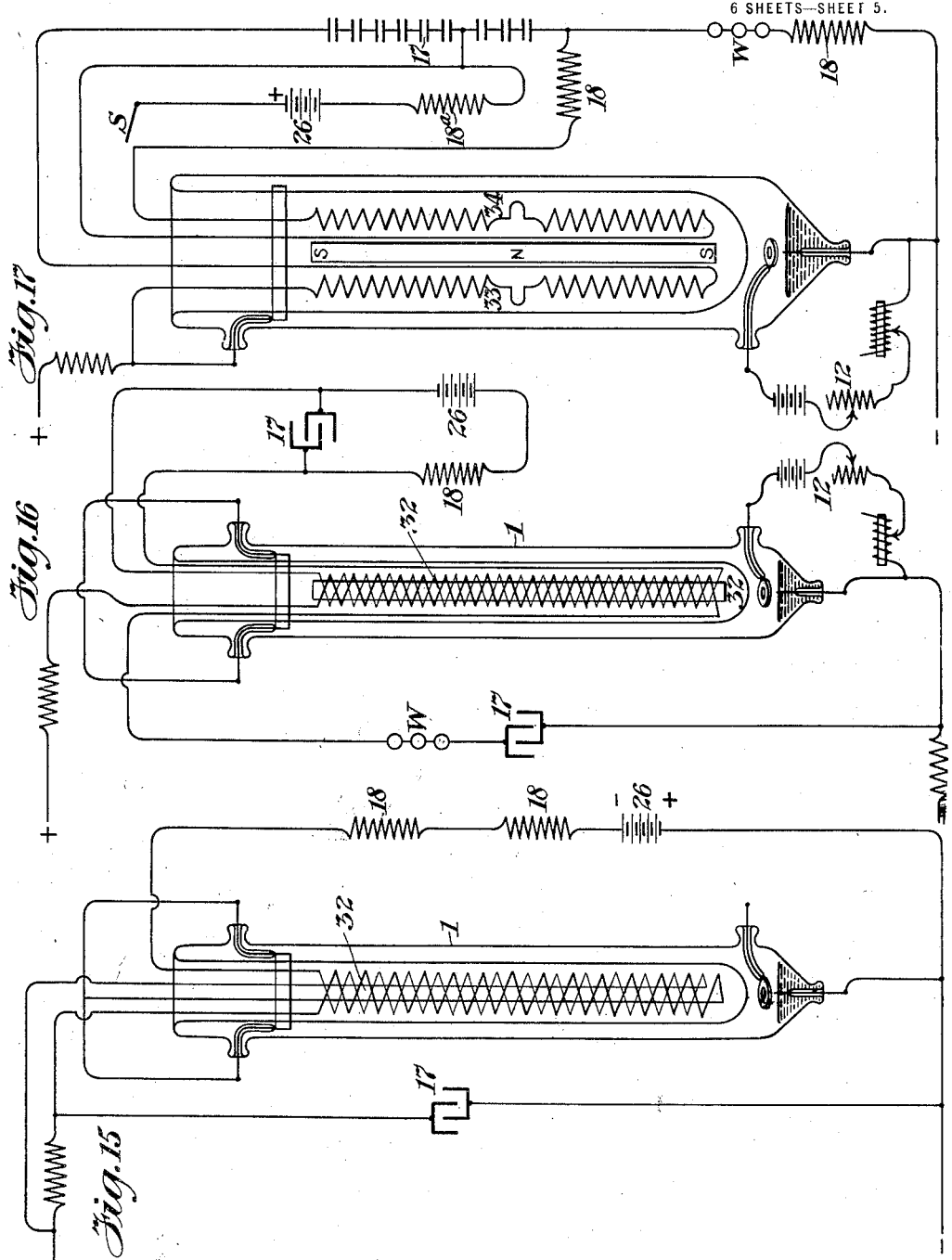

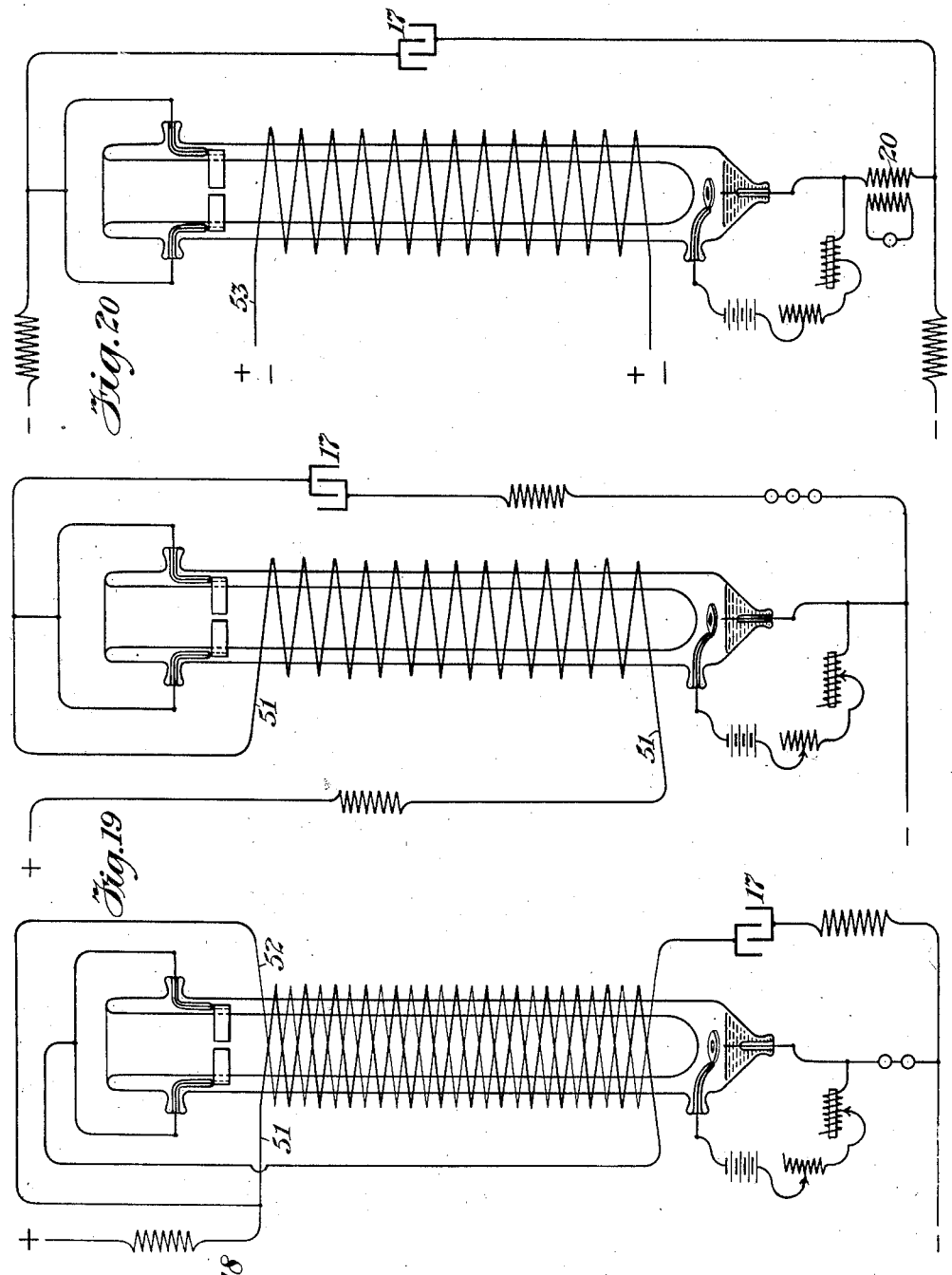

UNITED STATES PATENT OFFICE.

PETER COOPER HEWITT, OF RINGWOOD MANOR, NEW JERSEY.

METHOD OF AND APPARATUS FOR TRANSFORMING ELECTRICAL ENERGY.

1,321,432.     Specification of Letters Patent.     Patented Nov. 11, 1919.

Application filed May 12, 1914. Serial No. 838,032.

*To all whom it may concern:*

Be it known that I, PETER COOPER HEWITT, a citizen of the United States, residing at Ringwood Manor, in the county of Passaic and State of New Jersey, have invented certain new and useful Improvements in Methods of and Apparatus for Transforming Electrical Energy, of which the following is a specification.

In Patents Nos. 780,999 and 781,000, issued to me January 31, 1905, I have described and claimed methods of and apparatus for transforming direct current into periodic or alternating currents. My present invention relates to improvements in such method and apparatus, or systems.

With the apparatus described in my said patents at each period of operation the initial high starting resistance at the negative electrode of the tube had to be broken down, due to the fact that at each period of operation it was reëstablished. One of the objects of my present invention is to operate such a system, or analogous systems, by means of reactions in the vapor path independent of any assistance from the initial starting resistance of the tube at the negative electrode as set forth in my former patents. I accomplish this object by providing the tube with an auxiliary device for constantly keeping it "alive"—by which I mean constantly keeping it in a condition in which the initial resistance to starting residing at the negative electrode is not permitted to reëstablish itself, or, as it is sometimes called, in an "ionized" condition. When this is accomplished in any desired way (two ways of accomplishing it being hereinafter described) the current supplied to the tube and which is converted into periodic or alternating current, need be, if desired, of a voltage only high enough to maintain the flow from the main positive to the negative electrode when the negative electrode is "alive," which, as is well known, is much less than would be required to start the flow of current if the negative electrode were "dead."

Any suitable means for keeping the tube alive may be employed. For example, I have discovered, that the tube may be kept alive when used in this connection by subjecting some part of the space between the electrodes to the influence of an electric or magnetic field. This field may be produced by a permanent magnet or by a separately-excited magnet, or by a magnet connected in shunt, or in series, or compound wound. Instead of a magnet, a simple coil of wire traversed by a current may be employed to produce the desired electric or magnetic field, and, instead of employing a direct current magnet, an alternating currrent magnet or a transformer may be employed. Indeed, any suitable means for producing such field may be employed.

The means for producing the magnetic field may consist of plurality of windings surrounding the tube and also an additional winding located within the reëntrant portion of the tube.

Such a field may be used as the sole means of keeping the tube alive, or it may be used in conjunction with auxiliary keep-alive devices, since, in addition to its function of keeping the tube alive, the electric or magnetic field serves other important useful purposes. For example, the effect of such a field is to give the device while in a running condition a falling electromotive force characteristic, whereby the electromotive force required to pass unit current, when the tube is alive, decreases very rapidly as the current increase. Furthermore, it increases the apparent resistances of the tube—that is, the electro-motive force required to pass unit current when the tube is alive—and the apparent resistance increases or decreases in some direct proportion as the intensity of the field increases or decreases. It will be understood that under given conditions of constant electromotive force, the falling apparent resistance with increased current flowing and the falling electromotive force required to pass unit current with increased current flowing, are characteristics admirably adapted for promoting oscillations in a circuit having capacity and inductance, and for the abstraction of energy from such circuit. Also owing to the energy with which the circuit is caused to act, it may be made to control the energy delivered to it from a constant source.

Furthermore, in a system embodying parallel paths, one containing a vapor tube and the other capacity and inductance, the employment of a magnetic field to act on the vapor path between the electrodes of the tube serves to create a continuous undulating current, inasmuch as the tube is at all times maintained in a live condition; whereas, the same system, without the presence of said magnetic field, as described in my prior application Serial No. 267,982, filed June 1, 1905, would produce an intermittent current—that is, one in which the tube goes out at the end of each undulation. Furthermore, it renders unnecessary the presence of external inductance in the condenser circuit, or diminishes the quantity of the external inductance required. These, and other useful purposes accomplished by such electric or magnetic field, are described herein or in copending applications, e. g., Serial Numbers 838,033, 883,034, 838,035 and 838,036, filed May 12, 1914.

In describing the action of the magnetic field as keeping the tube alive I mean that, when said field acts on current flowing from the positive electrode to the negative electrode an undulatory current is thereby produced, the field acting as a "keep-alive" in that a continuous passage of current is maintained through the tube. By this action I am able to produce undulatory current of usable energy value.

In patents already issued to me—for instance, Nos. 682,695, 682,696 and 682,697, all dated September 17, 1901, I have fully described the construction and principle of operation of mercury vapor tubes of the general type illustrated in the drawings of this application, and therefore, need not repeat the description of the general principles in this application. While I have shown herein only mercury vapor tubes, it will be understood that any other analogous gas or vapor or evacuated tubes may be employed.

Referring to the drawings:

Figs. 4 to 9 show different arrangements and relations of the tube circuit, the condenser circuit and the work circuit.

Fig. 13 shows a system for the conversion of alternating current into direct current to be transmitted over the line, then the conversion of such direct current into alternating current, the transformation of the voltage of said alternating current by means of a transformer, and the conversion of said transformed alternating current into direct current.

Figs. 14 to 18 show tubes in which the desired electric or magnetic field is created by transformers or coils arranged in various ways.

Fig. 19 shows a tube and coil by which the field is created by current passing through the tube.

Fig. 20 shows a tube in which the electric field is produced by a coil wire traversed by an alternating current.

Figure 1:
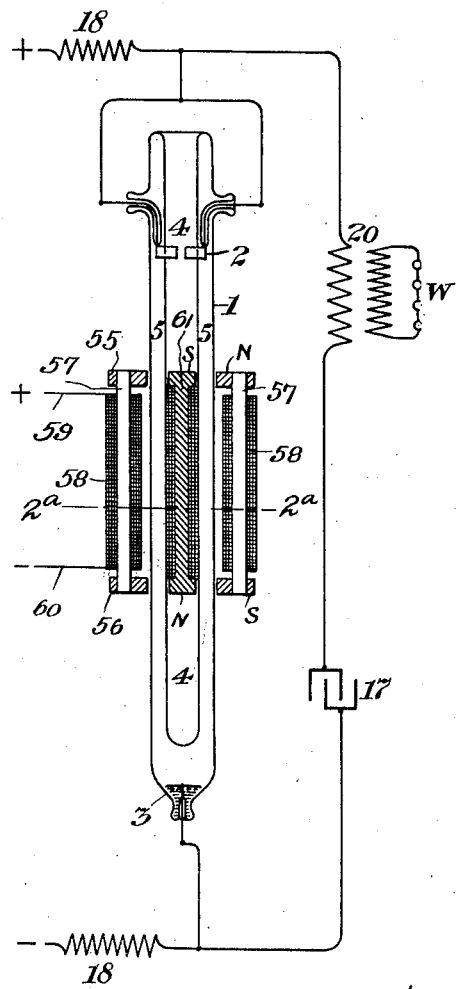
Figure 1 shows a system substantially like that shown in my said patents with electric or magnetic means for keeping it alive.

In Fig. 1 any suitable source of direct current is indicated by a plus and a minus sign; 18, 18, are inductances on the line; 1 is a mercury vapor tube having a main positive electrode 2 and a negative electrode 3. Instead of making the tube in the particular form shown in my prior patents, improved results are obtained by making it reëntrant in shape. 17 is a suitable condenser included in a circuit in parallel with the tube; 20 is a transformer in circuit which includes the tube and the condenser, which transformer supplies current to the work circuit and also acts as an inductance. An electromagnet is applied so as to impose upon some part of the space between the main terminals of the tube a magnetic field. The tube is made with a reëntrant portion extending nearly to the negative electrode, which results in the formation of a cylindrical space 5. The tube is provided with a circular positive electrode 2.

Figure 2:
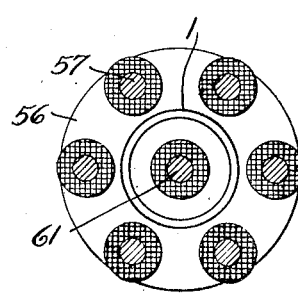
Fig. 2 is a sectional view along the line A—A Fig. 1.

In the embodiment shown in Figs. 1 and 2 there is shown at 55 and 56 the pole pieces of a magnet which surrounds the tube 1. At intervals along the pole pieces there are mounted the cores, 57, 57, of the magnet coils 58, 58. In this instance, the coils 58, 58, are so wound that the polarity of the pole piece 55 is north and the polarity of the pole piece 56 is south. Any number of coils, as desired, may be utilized, and the first coil receiving energy from the positive main 59 will have its bottom connected to the top of the next succeeding coil, and so one through the coils until the last one is reached, the bottom of which is connected to the negative main, 60.

A core 61, is mounted within the reëntrant portion of the device 1 and this element may be merely a good conductor of the lines of force utilized, or if it is supplied with a coil, then the coil will be so wound upon the core that the end opposite the pole piece 55 will be a south pole and the end opposite the pole piece 56 will be the north pole. The magnet 55, 56, may be a permanent one, or its coils may be excited from a constant source or from a variable one, and, the magnet 61, likewise, may be a permanent magnet, or supplied with varying or constant energy, as desired, and as set forth in my co-pending application Serial No. 838,035, filed May 12th, 1914.

If a magnetic field is impressed on a tube having an annular space between the electrodes, the effect is to tend to cause the current to rotate or to be elongated in helical forms by lateral displacement. This is apparently due to the fact that the annular space is subjected to a symmetrical field. Instead of having an annular space between the electrodes, any other form producing substantially the same results may be employed.

Furthermore, the annular or equivalent space between the electrodes largely assists in making the tube act to produce, even in the absence of a magnetic field, oscillating currents in connection with capacity and inductance.

As an example of the dimensions of one tube of the form described which has been successfully used, I will give the following, although it will be understood that these dimensions are given merely as an example, and that my claims are not limited in any respect thereto: total length between the main electrodes, 14 inches, outside diameter of the tube, 2 inches; diameter of the reentrant portion, 1½ inches; width of the annular space, ¼ inch. This tube has been successfully used with a direct current voltage of 240 volts.

Figure 3:
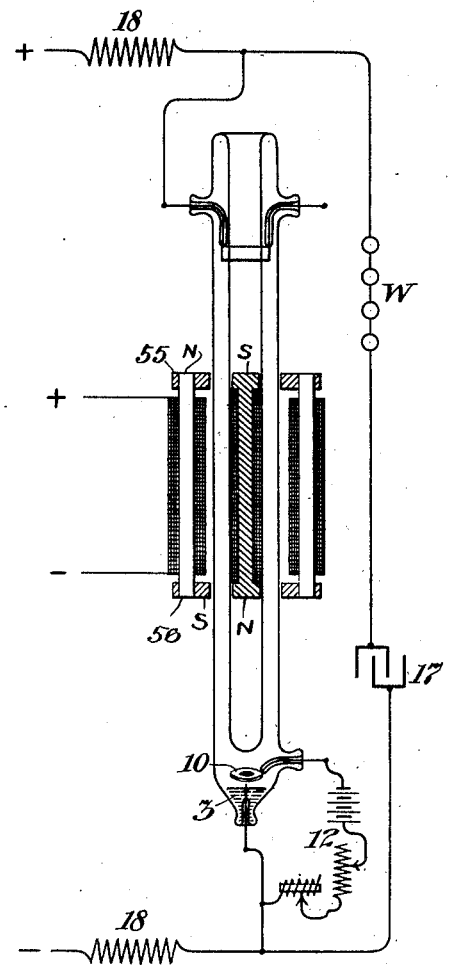
Fig. 3 shows a system the tube of which is provided with an auxiliary positive electrode and keep-alive circuit with means for impressing on the space between the main electrodes a magnetic field.

Fig. 3 differs from Fig. 1 in that the tube is kept alive by the joint action of an auxiliary positive electrode 10 included in an independent circuit 12 with a negative electrode, constituting the well known keep-alive device, and by the presence of a magnetic field. It also differs from Fig. 1 in that an inductance device, as such, is not included in the condenser circuit, but only a non-inductive load, such as electric lamps W, are included in said circuit. I have discovered that, when a suitable electric or magnetic field is applied to the tube, it is not necessary to employ an inductance device in circuit with the condenser, since the tube itself then apparently supplies the characteristic demanded, or acts as a substitute for inductance.

In practice, in some cases, I have found it useful to extend the solid negative conductors slightly above the surface of the mercury and to make the auxiliary positive electrode in the form of a plate, preferably perforated, as this serves to aid in steadying the current at the negative electrode, the arrangement requiring a minimum voltage for operation.

In Figs. 4 to 9 the relation between the elements of the oscillatory circuit (*i. e.*, the circuit which includes capacity, inductance and the tube) and the work circuit (shown as operating lamps W) is as follows: In Figs. 4 and 7 the work circuit is in shunt around the condenser. In Figs. 5 and 8 the work circuit is in shunt with both the tube and condenser circuits. In Figs. 6 and 9 the work circuit is in shunt around the inductance device.

Figure 10:
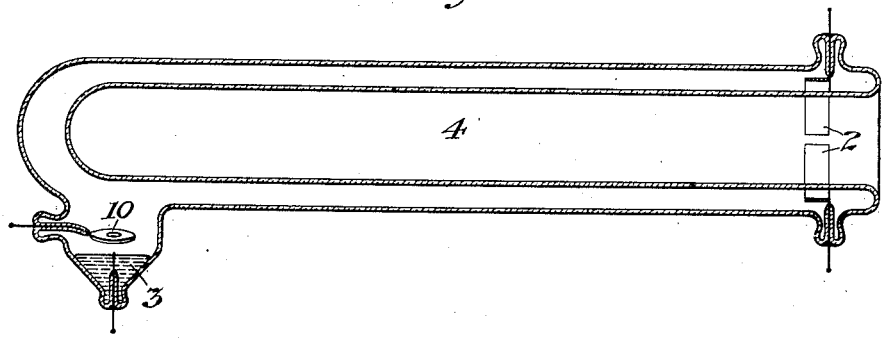
Figs. 10 to 12 show different forms of tubes.
Figure 11:
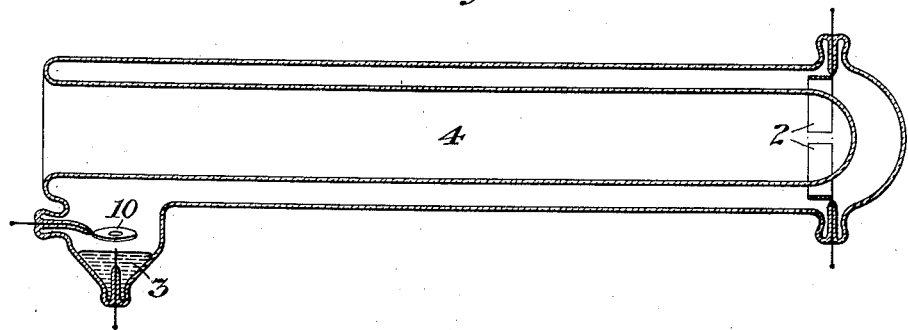
Figure 12:
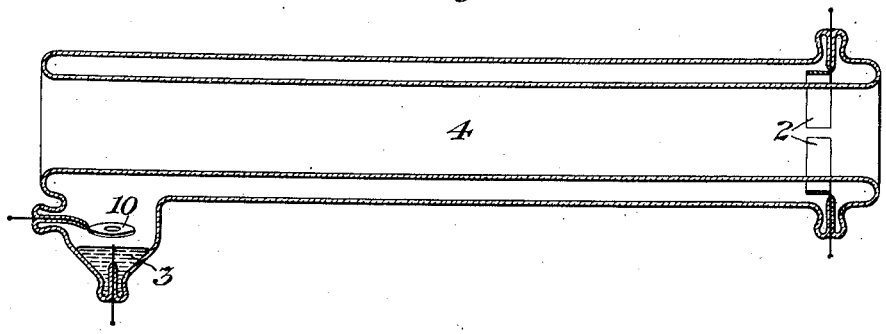

Figs. 10, 11 and 12 show different forms of horizontal tubes. In Fig. 10 the reentrant portion extends inward from the positive end. In Fig. 11 it extends inward from the negative end. In Fig. 12 it extends throughout the entire length of the tube, being open at both ends.

In Fig. 13 a system is shown involving, in addition to the various other parts, a source of high voltage alternating current 28 supplying a Cooper-Hewitt rectifier 29 which converts the alternating current into direct current in the line. The negative electrode of the rectifier is connected through an adjustable device 30 with a vapor tube 1, while the neutral point of the generator is connected through the line to the primary of the transformer 20, the secondary of which is here shown as connected through the primary of transformer 20ª, having a divided secondary 21ª connected with another rectifier 31. This arrangement receives the alternating current from a source 28, which current is converted into direct current and transmitted over the line to the device by means of which it is converted into alternating current which, by means of the transformers 20 and 20ª and the rectifier 31, is delivered as direct current of lower voltage.

Fig. 14 illustrates an arrangement in which the primary and secondary of a transformer 32 are inserted within the reentrant portion of the tube. One coil of this transformer is connected in series with the vapor path, and, if desired, in shunt upon a battery 26 and inductances 18. The other coil of the transformer in this instance feeds a work circuit W.

In this embodiment the transformer coils or windings act to produce the desired magnetic field intersecting the annular current path between the tube electrodes, and also to step the current in the work circuit up or down as may be desired. In the arrangement shown the primary contains the coarse winding and the secondary the fine winding so that the voltage in the work circuit is increased. As far as the action of the tube is concerned the transformer has a similar effect to the means shown in other figures of the drawings for impressing the field on the current path.

Fig. 15 illustrates a further modification somewhat similar to Fig. 14 but with a different arrangement of external circuits, the battery 26 and inductances 18 being here connected in series in the secondary circuit.

In Fig. 16 an arrangement is shown in which one coil of the transformer 32 located within the reentrant portion of the tube is in shunt upon the tube through the translating device W and the condenser 17, while the other coil is in series with inductances 18 and battery 26, the condenser 17 being connected in shunt upon the last-named device.

In Fig. 17 an arrangement is shown wherein a branch is taken from the supply conductor leading to the positive electrode, the branch including coils 33 and leading to a series of condensers 17, thence through the translating device W and inductances 18 to the negative conductor. A second set of coils 34 is connected in a circuit leading from a point between the condensers and the negative terminal of the condensers through an inductance 18. The other terminal of the coils 34 is connected through an inductance 18ª with a battery 26 leading to a switch S in the battery circuit.

In Fig. 18 an arrangement is shown wherein the gas or vapor tube is encircled with two coils 51 and 52, one of which (51) is in the supply circuit and the other of which (52) is in a shunt to said circuit including a condenser 17. When oscillations are set up and the condenser is charging, a field of force is set up by both coils in parallel, which tends to increase the electromotive force required to pass current. When the condenser is discharging, the condenser current passes through both coils in opposite directions whereby the field of force set up by one is neutralized by the other.

In Fig. 19 an arrangement is shown wherein a coil 51 encircles the gas or vapor tube, being in series therewith, thus creating an electric or magnetic field raising the electromotive force required to pass current without requiring a separate supply circuit for the coil or the use of a magnet.

In Fig. 20 is shown an arrangement for doubling the frequency of the alternating current. The coil 53 is supplied with current from any suitable alternating source. The primary of a transformer 20 is included in the lead to the negative and the secondary of this transformer is the work circuit for the double frequency alternating current. As the field of force created by the coil 53 varies, due to the alternating current, the electromotive force required to pass current through the lamp varies, and as, during each cycle the field has two maximum values, the electromotive force required to pass current will have two maximum values per cycle, hence the derived alternating current will be of double the frequency of the impressed current.

While I have given a number of different examples of apparatus and systems embodying my present inventions, it will be understood that these are given merely as examples and that my claims are not limited to these examples.

The term "gas or vapor tube" as used in these specifications and in the claims is intended to include all forms of devices which are the equivalent of a mercury tube for the purposes of this invention, irrespective of the contents of the tube or container, and irrespective of the means employed to keep the negative electrode alive, or to keep the resistance to starting at the negative electrode at a low value. The term, therefore, as used may include, for example, a tube exhausted to any degree, or a suitable current flow in air or other gas, and may include a device in which the negative electrode is kept constantly alive, or in which the resistance to starting at the negative electrode is maintained at a low value, by being highly heated; and may include any path between electrodes controlled mechanically or electrically, where the resistance to starting at the negative electrode is maintained at a low value.

Having thus described some of the preferred ways of practising my present invention what I claim is:

1. The method of producing periodic currents which consists in passing current to a capacity and a discharge device in operative relation thereto, impressing a field of force on the current path of said device, the lines of force cutting the current path radially, and increasing and decreasing the electromotive force required to pass current through said device in proportion to the increase and decrease of the intensity of the said field of force.

2. The method of producing periodic currents in a system comprising a suitable source of current, a capacity and a discharge device therefor, which consists in impressing a field of force on the current path of the discharge device, the lines of force cutting the current path radially, and increasing and decreasing the intensity of the impressed field of force.

3. The combination with a suitable source of current, of a capacity and a discharge device in operative relation thereto, said discharge device having an annular current path extending between the terminals thereof and parallel to the direction of current flow through the device, and means for increasing the voltage required to pass current through the device.

4. The combination with a suitable source of current, of a capacity and a discharge device in operative relation thereto, said discharge device having an annular current path extending between the terminals thereof and parallel to the direction of current flow through the device, and means for increasing and decreasing the electromotive-force required to pass current through the device.

5. The combination with a suitable source of current, of a capacity and a discharge device in operative relation thereto, said discharge device having an annular current path extending between the terminals thereof and parallel to the direction of current flow through the device, and means for increasing the voltage required to pass current through the device, in proportion to the current impressed thereon.

6. The combination with a suitable source of current, of a capacity and a discharge device in operative relation thereto, said conductor having an annular current path extending between the terminals thereof and parallel to the direction of current flow therethrough, and means for increasing and decreasing the voltage required to pass current through the device in proportion to the current impressed thereon.

7. The combination with a suitable source of current, of a capacity and a discharge device in operative relation thereto, said discharge device having an annular current path extending between the terminals thereof and parallel to the direction of current flow therethrough, and means for increasing and decreasing the voltage required to pass current through the device, said means consisting of lines of force cutting the current path radially.

8. The combination with a suitable source of current, of a capacity and a discharge device in operative relation thereto, and means for increasing and decreasing the electromotive force required to pass current through the device, said means consisting of lines of force radially cutting the current path through the device.

In testimony whereof I have hereunto signed my name in the presence of two subscribing witnesses.

PETER COOPER HEWITT.

Witnesses:
L. A. COLEMAN,
R. A. HEWITT.